Patented Aug. 7, 1945

2,381,838

UNITED STATES PATENT OFFICE 2,381,838

PREPARATION OF COOKED STARCHY VEGETABLES IN POWDER FORM

Theodore Rendle, Histon, England, assignor to Chivers & Sons Limited, Histon, England, a British company No Drawing. Application March 17, 1943, Serial No. 479,526. In Great Britain March 2, 1942

12 Claims. (Cl. 99—207)

This invention relates to improvements in and relating to the preparation of cooked starchy vegetables in powder form. Examples of such vegetables are edible roots, tubers and the like of high starch content, such for example, as potatoes, and the invention will herein be described with reference to its application to the preparation of cooked mashed potatoes in powder form.

Many attempts have been made to desiccate cooked mashed potatoes so as to obtain them in the form of a dry powder adapted to be readily reconstituted by the mere addition of water, and/or milk, and to be thus rendered suitable for consumption as cooked mashed potatoes.

Various difficulties have however been encountered, and these have, in the main, been due to the fact that when cooked vegetables of high starch content, such for example as mashed potatoes, are dried, they tend to change into a hard and horny mass or into particles coated with a hard or horny skin which is not suitable for being reconstituted into the normal and edible form.

Various attempts have been made to overcome this difficulty especially in the case of mashed potatoes. Thus, it has been suggested that the formation of the hard or horny mass can be avoided by controlling the conditions of cooking and by drying in stages under carefully controlled conditions of temperature whilst specially designed mechanical means for agitating the mass during drying have also been proposed. Neither of these processes is free from objections—the carrying-out on a large scale of a two or more stage drying operation involves complications and is open to economic objections whilst the use of the aforesaid mechanical means for keeping the mass in a state of motion and disintegration during drying is rendered difficult by the very nature of the mashed potatoes and by their readiness to bind into a tough or horny or rubber-like material. It has also been proposed to cook the potatoes, break up the mass and submit it to a partial drying process and then to disintegrate the partially dried material in a hammer mill so as to reduce the size of the particles without damaging the cell structure, the drying being subsequently completed. This latter process has involved two drying operations, as well as careful control of the hammer mill.

The object of the present invention is to provide a new and improved process for the preparation of cooked starchy vegetables, such as mashed potatoes, in powder form, which avoids these various difficulties.

According to the present invention there is provided a method of preparing cooked starchy vegetables such as mashed potatoes, in powdered and readily reconstitutable form, wherein the cooked and mashed vegetable is thoroughly mixed with an approximately equal weight of satisfactory seed powder as hereinafter defined, the mixture is reduced to the desired state of fineness without bursting the starch-containing cells, for instance, by being subjected to a sieving operation and the powdered and sieved material is then dried.

According to another feature of the present invention there is provided a method of preparing cooked starchy vegetables, such as mashed potatoes, in powdered and readily reconstitutable form, wherein the cooked and mashed vegetable is thoroughly mixed with such a quantity of satisfactory seed powder, as hereinafter defined, as to yield a product of powdery nature suitable for sieving to the desired fineness without bursting the starch-containing cells, the mixed product is reduced to the desired state of fineness by being passed through a sieve and the sieved material is then dried.

When the aforesaid sieving operation is reached the moisture content of the mixture to be powdered is preferably between 40 and 50% by weight and the sieving operation preferably involves the use of a sieve of between 12 and 18 mesh. I find that a mixture with the above mentioned water content can be urged through a 16 mesh sieve merely by shaking or by gently rubbing the material, i. e., without any treatment which may break down the vegetable cells.

The powdered material resulting from the aforesaid sieving operation is dried preferably, but not necessarily, by means of air heated to a temperature not exceeding about 250° F.

At the end of the drying operation which may be carried out in any practical and desired manner the moisture content should preferably be of the order of from 6–8% and this reduction may be effected in one or more stages.

The above mentioned dried and powdered material may if desired be subjected to a further sieving operation, using a relatively fine sieve, say 30 or 60 mesh, and in such cases the product passing through the sieve is used as the finished material which with the addition of hot water is adapted to form a reconstituted mashed product, and any slightly coarser grains which are retained by the sieve are preferably used as seeding material for treating further quantities of mashed vegetable.

Once the improved process is in full operation the seed powder for any particular batch can of course be retained from a previous batch, but when commencing to operate the process a seed powder of good quality, i. e. substantially free from the above mentioned hard or horny material, and capable of reconstitution to a non-sticky mash should first be produced. This can be done by drying some mashed potato by any convenient method, reducing it to powder form and mixing the powder with another batch of wet material, drying the mixture and utilising a portion of the resulting powder for treating another batch, and so on until a product is obtained which is substantially free from the original hard or horny or otherwise imperfect material and which is suitable for use. Thereafter a portion of any such satisfactory batch may be used for "seeding" a later batch.

I have found that in some cases the final product can be improved by freezing the wet vegetable, e. g., cooked mashed potato, by any suitable method, allowing it to stand and thaw, and then seeding the wet thawed material preferably with seed powder made from previously frozen mashed vegetable and drying as before.

In order that the invention may be well understood the following details of how it can be carried out are given only by way of example:

For the purpose of preparing dried mashed potatoes I first prepare the potato in the normal or any convenient way such as by washing, peeling and cooking. Whilst the cooking operation may be carried out by any suitable method I prefer to utilise potatoes of a relatively small size, or alternatively to cut the larger vegetables into halves or quarters, and to steam them preferably, but not necessarily at atmospheric pressure, in a closed vessel as this method largely avoids the loss of soluble substances which occurs when boiling in water is adopted. The cooked potatoes are then converted into the mashed form by any suitable means, and are preferably allowed to cool.

The next step is to mix the freshly prepared and cooled mashed potatoes with seed powder, the preparation of which is described below. As to the proportions of wet mashed potato and seed powder I prefer to use a weight of seed powder which is about equal to that of the wet mashed potato. The mixture may be effected in any convenient mixing apparatus, and it will be found when using the preferred proportions stated that the mixture will easily form into a moderately dry friable powder due to the absorption by the seed powder of moisture from the wet material. I prefer to adjust the proportions of seed powder and wet material so that the water content of this friable powder is from 40–45% by weight.

The next step is to reduce this friable powder to a fine powder which may be done by any suitable means which will not break the vegetable starch-containing cells. I have found that sieving the material through a 12-18 mesh sieve, preferably avoiding the use of copper, brass or iron, all of which tend adversely to affect the colour, flavour and vitamin content, gives a satisfactory result and breaks up the coarser particles; it will generally be found that this can be done merely by vibrating the sieve and without the use of rubbing or force, which should as far as possible be avoided as the sifted material should be of open or fluffy texture. If the proportions of seed powder and mashed potato have been adjusted correctly and the mixing suitably carried out the powder is sufficiently dry and friable to sieve through this mesh merely by vibrating the screen.

The sifted material is then further dried in any convenient manner, as for example by spreading it in thin layers on shelves in a vacuum drier, where it may be dried at a relatively low temperature, or alternatively by spreading it on trays and subjecting it to a current of warm or hot air, although any other convenient process may be employed for this purpose.

It may be here noted that according to my improved process there is only one drying operation and a wide range of drying conditions may be used, as the process affords the advantages of providing a large drying surface and a comparatively low initial moisture content in the material when heating commences.

The dried material will generally be found to contain a proportion of somewhat coarser particles which I prefer to sieve through a suitable sieve, say 25–60 mesh, and to retain the coarse particles for use as seed powder.

For the purpose of satisfactorily carrying out the process according to the present invention it is of course essential in the first instance to have available seed powder of satisfactory quality, by which is meant a powder which reconstitutes readily when mixed with nearly boiling water to a non-sticky mashed potato closely resembling the normal household product. Such a powder may be prepared by proceeding in the following manner:

A comparatively small quantity of wet mashed potato is thinly spread on a finely perforated tray and carefully dried with the object as far as possible to avoid the formation of the hard and horny particles which tend to be formed when mashed potato is dried by known methods, although the occurrence of such particles cannot entirely be avoided. For this purpose I prefer to use mashed potato previously frozen and thawed and to carry out the initial drying operation at a temperature not higher than 160° F. and preferably under reduced pressure. The resulting product is ground to a coarse powder which is then mixed with an equal weight of further wet mashed potato and the mixture sieved as described in the main process. The sieved mixture is again dried under the same or similar conditions. The operation is repeated with the powder resulting from the second drying except that grinding the dried powder is not now necessary, and so on until a "seed" powder of satisfactory quality is obtained. It will of course be clear that the powder resulting from each successive drying operation will contain a less percentage of that produced by the first few dryings so that any unsatisfactory or undesirable hard and horny material first produced will after a few operations amount to an almost negligible proportion of the whole, and the "seed" powder will ultimately attain a quality equivalent to that desired for the final product, and such a "seed" powder is hereinafter referred to as a "satisfactory seed powder." When preparing initial seed powder care should of course be taken as far as practicable to avoid fracturing or damaging the vegetable starch containing cell.

Once the full process is in operation, and an adequate stock of satisfactory seed powder has been produced the necessary proportion of the latter can be obtained from any desired previous batch or from the above-mentioned coarse particles obtained by sieving, and mixed with the next batch of freshly mashed potato. It is to be understood, however, that the material to be used as satisfactory seed powder may be of any degree of fineness.

As I have already stated the invention is not limited to any particular relative proportions of wet and seed material, and the optimum proportions to be selected will depend upon circumstances. To some extent the matter will be governed by considerations of economic working, whilst other considerations, such for example, as the advantages of maintaining the highest possible vitamin C content as against the advantages of rapid operation and possibly increased temperature of drying will need consideration, as it will be understood that the time required for drying will be reduced the greater the amount of the added seed powder is.

If desired I may introduce an additional step into the process consisting of the freezing of the mashed potato prior to its admixture with seed powder. This step it should be noted is however entirely optional, and can if desired, be omitted. I have found that if the mashed potato is frozen and then preferably immediately allowed to thaw the resulting product is more granular and less gelatinous in texture than when freezing is omitted. The thawed material may be mixed with seed powder, which in this case is preferably, but not necessarily, made from mashed potatoes which have been frozen and treated in the manner described and it will be found that the introduction of the freezing step renders the resulting product more friable and expedites the final drying. The resulting product moreover is lighter in character, more easily reconstituted in contact with water and more nearly approaches the original fresh mashed potato than in the case of a product similarly treated but without the freezing step.

So as to avoid the possibility of any misunderstanding, it may be said that I do not suggest that a mashed potato powder prepared according to the present invention will be entirely free from burst vegetable cells, as it is clear that the mere cooking and mashing operations may and generally do cause fracturing of some few of these cells. It is however, an essential feature of the present process to keep the number of such fractured or burst cells in the finished product as small as possible.

Although the invention has herein been described particularly with reference to the drying of mashed potatoes it should be clearly understood that this has been done for purposes of illustration, and that the invention is not limited in this respect but can be applied for the drying of other cooked starchy vegetables.

I claim:
1. The method of preparing cooked mashed potatoes, in powdered and readily reconstitutable form from a mass of the cooked and mashed vegetable, which comprises performing successively and in the order set forth the steps of thoroughly mixing the same with an approximately equal weight of satisfactory seed powder, reducing the mixture to the desired state of fineness by a sieving operation, drying the powdered and reduced material, the said reducing and drying operations being so carried out as to preserve substantially all of the vegetable starch granule containing cells.

2. The method of preparing cooked mashed potatoes, in powdered and readily reconstitutable form, from a mass of the cooked and mashed vegetable, which comprises thoroughly mixing the same with a substantially equal quantity of satisfactory seed powder as to yield a product of powdery nature suitable for sieving to the desired state of fineness without bursting the vegetable starch granule containing cells, reducing the mixture to the desired state of fineness and drying the reduced material, the said reducing and drying operations being so carried out as to preserve the vegetable starch granule containing cells.

3. A method as claimed in claim 1 wherein the proportions of mashed vegetable and seed powder are so chosen that the moisture content of the mixture is between about 50% and 40%.

4. A method as claimed in claim 1 wherein the said sieving operation comprises passing the material through a sieve of between 14 and 18 mesh.

5. A method as claimed in claim 2, wherein the material to be sieved is gently agitated in order to promote its passage through the sieve, the intensity of such agitation being limited to preserve in unbroken condition substantially the entire vegetable cell content of the mass.

6. A method as claimed in claim 2 wherein the sieved product is subjected to a drying operation during which the moisture content is reduced to a value of the order of from 6–8% by weight of the powdered mass.

7. A method as claimed in claim 1 wherein the said drying operation involves the use of heated air.

8. A method as claimed in claim 2 wherein the dried and powdered material is subjected to a further sieving operation, the sieve employed being of from 30–60 mesh.

9. A method as claimed in claim 1 wherein the seeding powder comprises grains retained by the said sieve in a previous performance of the same method.

10. A method as claimed in claim 2 including the step of freezing the mashed vegetable and allowing the frozen mass to thaw before adding satisfactory seed powder thereto such seed powder being derived from a batch the production of which included the step of freezing the mass.

11. A method as claimed in claim 1 wherein the seed powder is initially obtained by cooking and mashing the vegetable concerned, drying the wet mashed product, reducing it to powder by any suitable means and then mixing a quantity of such powder with a quantity of further mashed vegetable, sieving the mixture drying the sieved mixture and repeating the drying process any desired number of times until the final powdered product is of suitable characteristics as regards reconstitutability and flavour.

12. The method as set forth in claim 2 in which the drying step involves suspending the mixture in a current of heated air.

THEODORE RENDLE.